US010765066B2

(12) United States Patent
Schulze Selting et al.

(10) Patent No.: US 10,765,066 B2
(45) Date of Patent: Sep. 8, 2020

(54) HARVESTING HEAD COMPRISED OF SEVERAL SECTIONS WITH BEND PROTECTION AND METHOD FOR HEIGHT CONTROL OF THE HARVESTING HEAD

(71) Applicant: Carl Geringhoff GmbH & Co. KG, Ahlen (DE)

(72) Inventors: Stephan Schulze Selting, Ennigerloh (DE); Steffen Sudhues, Ahlen (DE); Jan Schulze Rückamp, Ennigerloh (DE); Jochen Scharmann, Warendorf (DE); Raphael Stückmann, Drensteinfurt (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 184 days.

(21) Appl. No.: 16/013,966

(22) Filed: Jun. 21, 2018

(65) Prior Publication Data

US 2018/0368317 A1    Dec. 27, 2018

(30) Foreign Application Priority Data

Jun. 21, 2017   (DE) .................. 10 2017 113 776

(51) Int. Cl.
*A01D 41/14*  (2006.01)
*A01D 75/28*  (2006.01)
(Continued)

(52) U.S. Cl.
CPC ......... *A01D 75/287* (2013.01); *A01D 34/008* (2013.01); *A01D 41/127* (2013.01); *A01D 41/141* (2013.01); *A01D 41/145* (2013.01)

(58) Field of Classification Search
CPC .... A01D 34/008; A01D 34/006; A01D 34/24; A01D 34/28; A01D 34/283;
(Continued)

(56) References Cited

U.S. PATENT DOCUMENTS 4,487,004 A * 12/1984 Kejr ................. A01D 41/14
56/14.4
5,918,448 A *  7/1999 Wheeler .......... A01D 75/287
56/10.2 E
(Continued)

FOREIGN PATENT DOCUMENTS

EP    2 832 206    2/2015
EP    3087819    11/2016

*Primary Examiner* — Alicia Torres
*Assistant Examiner* — Adam J Behrens
(74) *Attorney, Agent, or Firm* — Gudrun E. Huckett (57) ABSTRACT

A harvesting head has a middle section connected to a carrier device and at least one side section connected by an articulated connection to the middle section about which the side section pivots between a lower and an upper limit value. The carrier device has a height adjustment device whose adjusting movements are controlled by a control. The harvesting head has a sensor transmitting a sensor signal to the evaluation device at least upon pivoting of the side section when a limit value has been achieved during pivoting of the side section to the middle section. The evaluation device switches upon the presence of a corresponding sensor signal into a correction mode for height adjustment of the carrier device. The evaluation device outputs an adjusting signal in the correction mode to adjust the carrier device up or down by the evaluation device according to the sensor signal.

4 Claims, 4 Drawing Sheets

(51) Int. Cl.
*A01D 34/00* (2006.01)
*A01D 41/127* (2006.01)

(58) Field of Classification Search
CPC .... A01D 34/286; A01D 34/74; A01D 41/127; A01D 41/141; A01D 41/145; A01D 41/144; A01D 41/14; A01D 75/285; A01D 75/287
See application file for complete search history.

(56) References Cited

U.S. PATENT DOCUMENTS

| | | | |
|---|---|---|---|
| 9,198,349 | B2 | 12/2015 | Ritter et al. |
| 9,668,412 | B2 * | 6/2017 | Ritter ................... A01D 41/141 |
| 2003/0074876 | A1 * | 4/2003 | Patterson ............... A01D 41/14 56/257 |
| 2007/0204582 | A1 * | 9/2007 | Coers ................... A01D 41/141 56/10.2 E |
| 2011/0030326 | A1 * | 2/2011 | Markt ................... A01D 41/14 56/14.5 |
| 2015/0013795 | A1 * | 1/2015 | Ritter ................... A01D 41/145 137/596.16 |
| 2015/0033692 | A1 * | 2/2015 | Schroeder ............ A01D 41/141 56/10.2 E |
| 2016/0007531 | A1 * | 1/2016 | Schlipf ................ A01D 41/141 56/10.2 E |
| 2016/0183461 | A1 * | 6/2016 | Neudorf ................. A01D 41/14 56/158 |
| 2016/0316624 | A1 * | 11/2016 | Ritter ................... A01D 41/141 |
| 2017/0013778 | A1 * | 1/2017 | Borry ................... A01D 41/145 |
| 2017/0064904 | A1 * | 3/2017 | Figgins ................ A01D 34/006 |
| 2018/0139898 | A1 * | 5/2018 | Shearer ................. A01D 41/14 |
| 2018/0192587 | A1 * | 7/2018 | Berggren ............. A01D 75/285 |
| 2018/0279549 | A1 * | 10/2018 | Lacy ................... A01D 41/145 |
| 2019/0230857 | A1 * | 8/2019 | Thomson ............... A01D 34/04 |

\* cited by examiner

HARVESTING HEAD COMPRISED OF SEVERAL SECTIONS WITH BEND PROTECTION AND METHOD FOR HEIGHT CONTROL OF THE HARVESTING HEAD

BACKGROUND OF THE INVENTION

The present invention relates to a harvesting head comprised of several sections for being attached to a harvester, with a middle section comprising the connection elements with which the middle section can be attached to a carrier device of the harvester, and with at least one side section which is connected by an articulated connection to the middle section and about which the side section can pivot from a lower to an upper stop, wherein the carrier device comprises a device for the height adjustment whose adjusting movements are controlled by an evaluation device which is connected to sensors which constantly measure the ground distance of one or more sections of the harvesting head during the forward travel of the harvester, the evaluation device converts the sensor signals of the sensors into adjusting commands for changing the height level of the device for adjusting the height and transfers these adjusting commands to an actuator of the device for the height adjustment. The invention also relates to a method for regulating the height of such a harvesting head.

U.S. Pat. No. 9,198,359 B2 teaches a harvesting head comprised of several sections. The height level of the harvesting head is primarily changed by an adjusting of the carrier device of the harvester, in the exemplary embodiment a combine as a harvester with an oblique transport channel as a carrier device. Usually, receptacles for a harvesting head which make possible an additional height adjustment such as, for example, standing hydraulic cylinders on which the surface rests are located on the oblique transport channel, which can be adjusted in height on its front end. These hydraulic cylinders are in the sense of this invention a possible component of the carrier device with which the height adjustment of the harvesting head can also be carried out during the harvest or in a supplementary manner. Therefore, a carrier device can have several possibilities of adjustment for setting the working height of a harvesting head, namely, for example, by the height adjustment of the oblique conveyor and by the additional adjustable carrier cylinders which can be used in particular for a rotating of the harvesting head about the longitudinal central axis.

The height adjustment is necessary in order to adapt the height level of the harvesting head during the forward travel of the harvester in the case of uneven ground conditions to the constantly changing distances of the harvesting head to the ground. If the harvesting head is too high, the harvested material can be cut to high or even not cut at all, which results in undesired losses of the harvested crops. If the harvesting head is adjusted to local, damaged can occur to the harvesting head on account of a collision of structural components of the harvesting head with the ground.

In the case of rather large working widths of the harvesting heads it is no longer sufficient to adjust the height of the harvesting head only by a height adjustment by the carrier device to a desired distance to the ground. In the case of rather large working widths the ground can have such height differences even in the direction transverse to the direction of travel of the harvester over the working width that an adaptation of the height of the side sections of the harvesting head which is separate from the middle section is necessary. In the harvesting head in document U.S. Pat. No. 9,198,349 B2 this is solved by an adjustment by motor of the bending angle between the middle section and the particular side section which takes place as a function of a distance of the side section from the ground, which distance is determined by sensors. The adjustment of the pivoting position of the side sections by motor takes place via hydraulic cylinders in which the pressure should be held at a constant level. Correspondingly changeable bending angles of the transverse axes of the side sections in comparison to the transverse axis of the middle section are adjusted in the running adjustments of the hydraulic cylinders.

EP 3 087 819 A2 teaches measuring forces acting counter to the direction of travel—that is, in the horizontal direction—on the harvesting head by sensors and in the case of rising sensor values to change the pivoting position of the side harvesting head parts relative to the middle part of the harvesting head in such a manner that the acting forces are reduced again. This procedure is disadvantageous because the changing of position of the side harvesting head parts relative to the ground is not started until the sensors are already measuring a rise of the acting forces. Damage to the harvesting head can already have occurred before the side harvesting head parts have been moved into a non-critical position of height. Even if no direct damage occurs, the harvesting head is subjected by the constant load change to increased wear. The middle part of the harvesting head is not taken into consideration in this type of height adjustment.

Furthermore, a harvesting head is known from the prior art which is produced by the Geringhoff company and is distributed under the designation of "Truflex". In this harvesting head the side sections are supported on the ground by a wheel undercarriage. The height position of the middle section is also adapted here by the sensor-supported adjustment of the carrier device of the harvester to changing ground distances. The signals for the height adjustment are determined by touch rods which measure the distance to the ground. Since the side sections are connected to the middle section by an articulation whose articulated shaft faces in the travel direction of the harvester and the side sections are supported against the ground by their own undercarriage, the side sections can copy the contour of the ground by the undercarriage and adjust themselves in a continuous manner to an individual distance to the ground of the particular side section which corresponds to an acceptable distance in the area of the undercarriage. The undercarriage can also be adjusted in height in this harvesting head, wherein the height adjustment takes place according to the sensor signals of the associated ground touchers. However, continuously changing bending angles of the transverse axes of the side sections relative to the transverse axis of the middle section result here in particular in the case of uneven ground conditions.

The problem arises in the known harvesting heads that the mobility of the side sections is technically limited in comparison to the middle section. Once the technical limits have been reached, elevated loads act on the articulated connections. This is especially true if the terrain contour actually would require a further adaptation in height of the side sections, whether it is downward or upward, which, however, is not possible on account of the technical limits of the articulated connections. There is then the danger that the concerned side section is rammed into the ground during the further advance of the harvester and/or that structural components of the articulated connections are bent and damaged. Also, the harvesting head can be pushed onto the ground, as a result of which the carrier device with the harvester associated with it could be raised. That can lead to significant damage to the carrier device.

The present invention concerns the problem of reducing the danger of damage to the harvesting head and to the structural components of the articulated connections.

SUMMARY OF THE INVENTION

The problem is solved for a generic harvesting head in that the harvesting head comprises a sensor which transmits the sensor signal via a communication means to the evaluation means at least upon a pivoting movement of the side section when a limit value has been achieved during the pivoting motion of the side section to the middle section, the evaluation device comprises an evaluation circuit which switches the evaluation device upon the presence of an appropriate sensor signal into a correction mode for the height adjustment of the carrier device, and the evaluation device outputs an adjusting signal in the correction mode with which the carrier device is adjusted up or down by the evaluation device according to the sensor signal, and the evaluation device emits an adjusting signal in the correction mode with which the carrier device is adjusted by the evaluation device into a movement which rotates the harvesting head about the longitudinal middle axis.

The problem is solved for a method for regulating the height of a generic harvesting head in that the harvesting head comprises an evaluation device with which a sensor is queried in a software-supported manner which, upon a pivoting movement of the side section, transmits at least one sensor signal via a communication means to the evaluation device when a limit value has been reached during the pivoting motion of the side section to the middle section, the evaluation device switches via an evaluation circuit upon the presence of a corresponding sensor signal into a correction mode for the height adjustment of the carrier device, and the evaluation device outputs an adjustment signal in the correction mode with which the carrier device is adjusted upward or downward by the evaluation device according to the sensor signal, and the evaluation device outputs an adjustment signal in the correction mode with which the carrier device is adjusted by the evaluation device into a motion which rotates the harvesting head about the longitudinal middle axis.

It is possible with the sensor-controlled bending protection to correct the height regulation of the harvesting head in the correction mode in such a manner that that the height regulation of the harvesting head no longer adjusts the harvesting head in such a manner that the bending of the components of the articulated connection and of the frame of the side sections and of the middle section is additionally stressed. The bending protection by the height control of the middle section can take place here independently of whether the side sections are provided with a wheel undercarriage, can be adjusted by hydraulic cylinders as adjusting motors in their pivoting position or whether some other active or passive regulation of the height position is present. As a result of the fact that the height adjustment of the middle section is actuated at bending angles considered as critical, the risk that disturbances in the harvesting caused by position regulating stops and bending angle stops is greatly reduced.

The sensor for monitoring the pivoting can be a simple mechanical, electrical or electronic switch which transmits a switching signal when the side section strikes against a stop during its pivoting motion. However, it can also be constructed as an angle of rotation sensor such as, for example, a potentiometer which measures pivot angles in a clocked manner or continuously and transmits them to the evaluation device. If the harvesting head comprises two side sections which are connected to the middle section, the movement of each side section is advantageously monitored by its own sensor.

The limit value at which the sensor signal is transmitted can correspond to the mechanical stop at which the mechanical movability of the articulated connection ends. However, the limit value can also be defined to be where the pivoting movement of the side section has not yet reached the mechanical stop but has almost reached it. Therefore, a virtual stop can also be defined which does not correspond to the mechanical stop. If the limit value is defined shortly before the reaching of the mechanical stop, the evaluation device still has time to control the carrier device in the correction mode and to raise or lower the middle section as needed so that the stop is either no longer reached or the stop movement of the side section is no longer as hard as it would be if the carrier device had not already raised or lowered the middle section already in the correction mode.

The communication between the sensor and the evaluation device can be as desired, for example, via a traditional copper or glass fiber cable or via a radio connection.

The correction mode is characterized in that in it the determination of the theoretical height position of the middle section to the harvester and to the ground no longer takes place only in the evaluation device as a function of the sensors which continuously determine the distance to the ground but rather the sensor values of the sensor measuring the pivoting movement enter at least into the calculation of adjustment magnitudes for adjusting the carrier device in order to avoid the disadvantages known from the prior art.

When the free end of a side section has been pivoted so far down that the sensor reports the reaching of the limit value, the free end of this side section most probably is hanging in the air and its entire weight is being carried by the articulated connection to the middle section. This heavily loads the articulated connection. However, when the free end of the side section is in the air, there is in particular the risk that the knife beam no longer cuts the harvest material at its lower stalk end but rather in the area of the fruit or not at all. That would directly lead to a loss of harvested material. In this situation the correction mode can provide lowering the middle section of the harvesting head via the carrier device. The resulting lower layer of the middle section also simultaneously lowers the attachment zone of the side section to the articulated connection. If it is successful that the middle section is lowered so far in the correction mode that the side section is itself again supported on the ground, the bending angle between the side section and the middle section is reduced. The mechanical stop is removed by this reduction of the bending angle. However, the raising of the free end of the side section achieved in this manner also lowers the risk that the free end of the harvesting head could bore into the ground upon a new elevation of the ground during the forward travel of the harvester.

If the free end of a lateral section has been pivoted so far upward that the sensor reports the reaching of the limit value, a sagging of the harvesting head could occur or the free end of the side section could be rammed into the ground if the harvester continues its advance. In order to avoid this, it is possible to raise the middle section in the correction mode via the carrier device. The attachment zone of the side section to the articulated connection is also raised upward by the raised middle section. This tends to reduce the load on the articulated connection.

The evaluation device outputs an adjustment signal in the correction mode with which the carrier device is put by the evaluation device into a motion which rotates the harvesting head about the longitudinal middle axis. If side sections are suspended on the right and the left on the middle section, it is possible that the first sensor of a side section reports a hanging-down free end of this side section while the second sensor of the other side section signals a free end of this side section which is pivoted upward. In this case it is advantageous if the evaluation device rotates the harvesting head in the correction mode about the longitudinal middle axis of the harvester which axis faces in the direction of travel. As a result thereof, the one end of the middle section is raised and the opposite end is lowered, as a result of which both side sections have been helped and the articulated connections have been relieved.

According to an embodiment of the invention the evaluation device queries the sensor values of the sensors continuously measuring the distance to the ground of the harvesting head in the correction mode, determines whether a minimum distance to the ground is being maintained, and blocks a further lowering of the carrier device by a safety circuit if the query of the sensor values signals the achieving of the minimum distance. The safety circuit should ensure that the correction mode does not result in that the middle section is lowered so far down over a minimum distance to the ground on account of the bending angle of one or more side sections relative to the middle section that the middle section itself drags over the ground, bores into the ground with the points and the knife beam, or pushes so hard on the ground that as a result the carrier device is stressed.

According to an embodiment of the invention the evaluation device queries the sensor values of the sensors continuously measuring the distance to the ground of the harvesting head, compares the series of this sensor data and its sequence and derives from it a trend prediction of an adjusting direction imminent from the measuring of the distance to the ground for the middle section, queries the sensor values of the sensors continuously monitoring the pivoting motion of the side section, compares the series of the sensor data in its sequence and derives from it a trend prediction of an adjusting direction imminent from the measuring of the pivoting movements of the side sections for the middle section, conducts both trend predictions to a bandwidth filter and emits an adjusting signal in the case of an absence of a value from the bandwidth filter with which signal the carrier device is moved up or down by the evaluation device according to the results of the evaluation of the bandwidth filter.

In this regulating the evaluation device does not wait until a sensor value has reached a limit value but rather the sensor values are compared with each other in a dynamic model in which prognostic values for an imminent adjusting of the height of the harvesting head are included in the regulating. This can achieve a more uniform regulation which does not react so quickly and violently to changes of sensor data. If the trend prediction shows that the harvesting head must be raised because the ground distance of the middle section is approaching the minimum distance, the appropriate adjusting movement can be initiated already in a correspondingly early manner if the trend prediction for the pivoting movements of the side sections in the bandwidth filter do not show that such an adjusting movement would lead to undesired bent angles of the side section. However, if the trend prediction of the pivoting movements of the side sections show that a raising of the middle section could result in that the limit value valid for it had been reached, an adjustment can wait until the distance value for the middle section actually reaches the value for the minimum distance. The correction steps which then follow can, however, be selected to be smaller if the trend prediction of the pivoting movements of the side sections in the bandwidth filter furthermore show that limit values area being exceeded or have already been exceeded. On the other hand, more generous adjusting movements can take place if it results from the bandwidth filter that a greater adjusting movement of the ground distance does not result in that the bent angles of the side sections could reach the limit values. As was described above for the middle section, even adaptations in height which can be recognized as necessary from the trend prediction of the pivoting movements of the side sections are amplified or damped by the bandwidth filter. The regulation is readily possible by an appropriately programmed software.

According to an embodiment of the invention the support wheels arranged on the side sections can be adjusted in height, the adjustment in height of the support wheels takes place by the evaluation device, and the evaluation device holds the support wheel in the correction mode of the associated side section in the current position or moves it downward if a sensor for the particular side section transmits a sensor signal to the evaluation device which indicates that the side section is located in the area of its lower stop and/or of the lower limit value. As a result thereof, the particular support wheel is set earlier onto the ground if during the further advance travel of the harvester the distance of the bottom of the side section to the ground becomes less again. The risk that the particular side part could collide with the ground without being supported by the associated support wheel is reduced.

Other features of the invention result from the claims, the figures and the description of the figures. All features and feature combinations cited previously in the specification as well as the features and feature combinations cited in the following in the description of the figures and/or shown only in the figures can be used not only in the particular indicated combination but also in other combinations or, however, by themselves.

BRIEF DESCRIPTION OF THE DRAWINGS

The invention will now be explained in detail using a preferred exemplary embodiment and referring to the attached drawings.

In the drawings.

DESCRIPTION OF PREFERRED EMBODIMENTS

Figure 1:
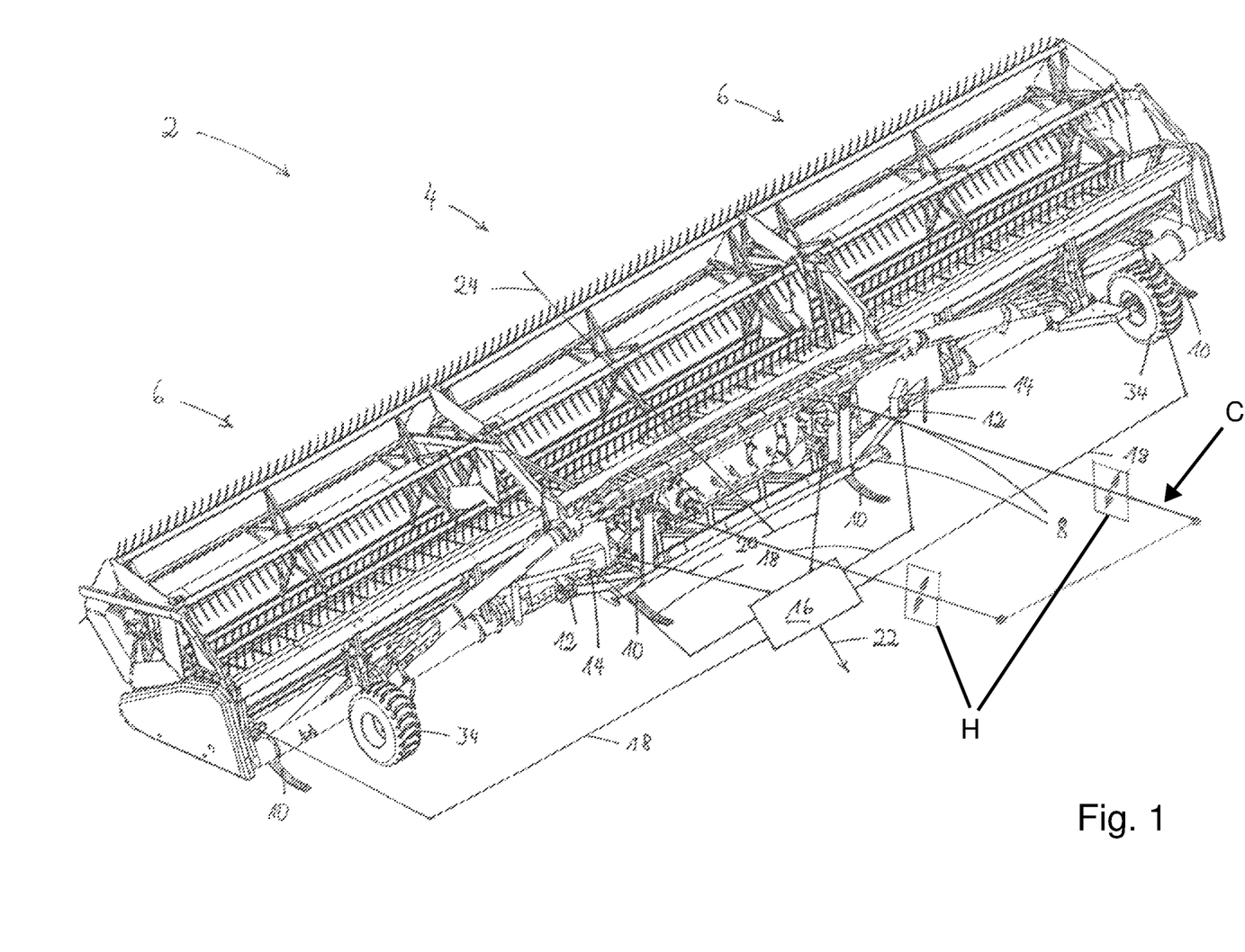
FIG. 1: shows a oblique rear view of a harvesting head.

FIG. 1 shows a view of a harvesting head 2 from an oblique rear perspective. The harvesting head 2 consists in the exemplary embodiment of a middle section 4 and two side sections 6 attached to it. The harvesting head 2 is connected by connection elements 8 to the entrance conduit of a combine.

The harvesting head 2 comprises in the exemplary embodiment a total of four sensors 10 with which the distance to the ground of the harvesting head 2 can be continuously measured. The sensors 10 are in the exemplary embodiment pivotable ground surface feelers which are coupled to a rotary potentiometer.

The middle section 4 is connected to each of the side sections 6 by an articulated connection 12. The articulated connection 12 consists of a rotary shaft about which the side sections 6 can pivot with their free ends up or down.

Sensors 14 are connected to the two articulated connections 12 with which sensors the bending angle which a side section 6 has to the middle section 4 in a particular state of use can be determined.

The harvesting head 2 comprises an evaluation device 16 which is connected by connection lines 18 to the sensors 10 and by connection lines 20 to the sensors 14. The particular sensor values of the sensors 10, 14 can be transmitted by the connection lines 18, 20 to the evaluation device 16.

In the evaluation device 16 a computer converts the sensor signals of the sensors 10 into adjusting commands for changing the height level of the device for the height adjustment with an appropriately designed software. These adjusting commands are forwarded by a connection line 22 to the device for the height adjustment which is located in the combine not shown in detail in FIG. 1. Therefore, the connection line 22 designates an interface to the electronic system and actuating system of the harvester to which the harvesting head 2 is attached.

The device for height adjustment cannot only raise and lower the harvesting head 2 in accordance with its design but it is also additionally possible to rotate the harvesting head 2 about the longitudinal middle axis 24 if this seems to be necessary based on the sensor data of the sensors 10 and/or of the sensors 14.

The undercarriage of the harvesting head 2 consists of the two support wheels 34 associated with one of the side sections. The support wheels 34 can be adjusted in height in the exemplary embodiment.

Figure 2:
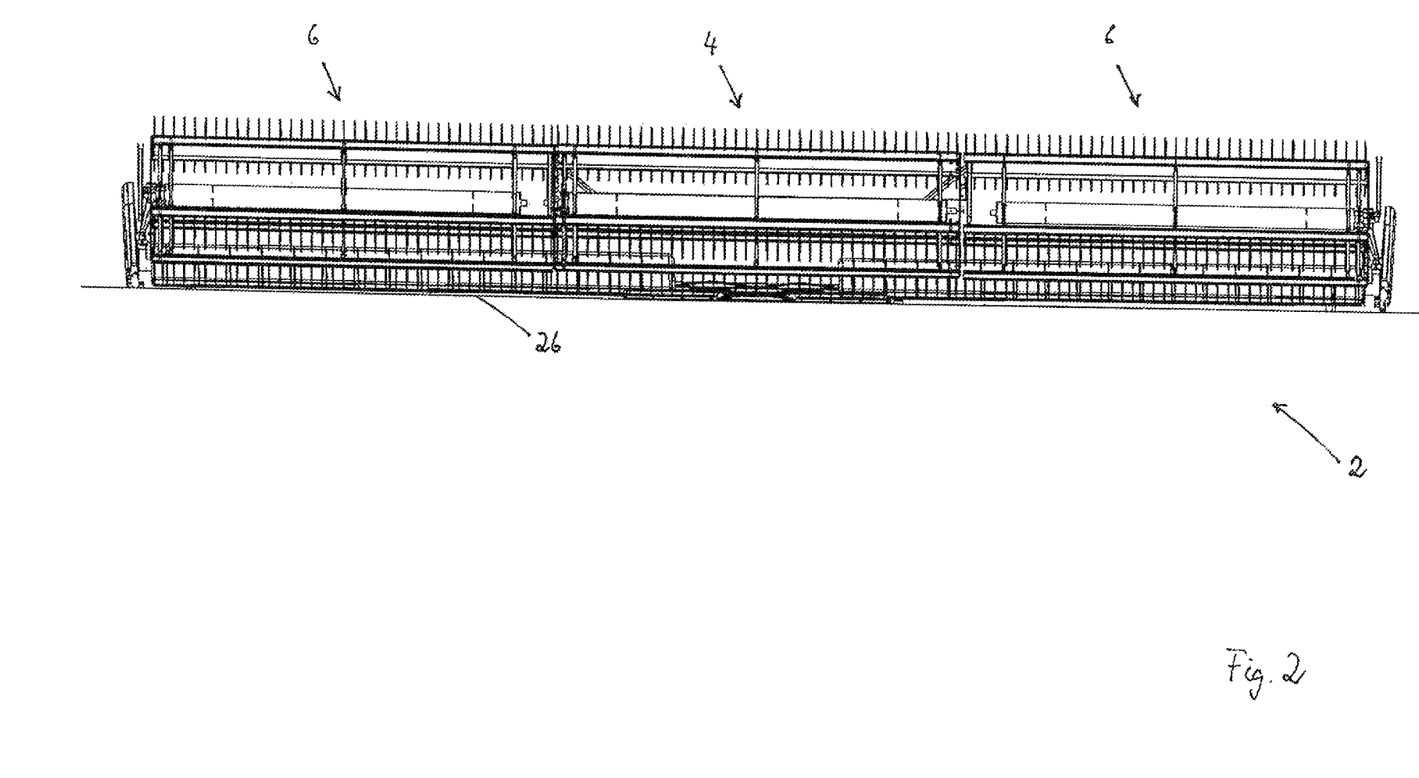
FIG. 2: shows a view onto the harvesting head resting on a flat ground.

FIG. 2 shows the harvesting head 2 in a front view in a harvesting situation in which the harvesting head 2 is being moved over a flat ground 26. No bending angle arises between the middle section 4 and the side sections 6 due to the flat ground 26.

Figure 3:
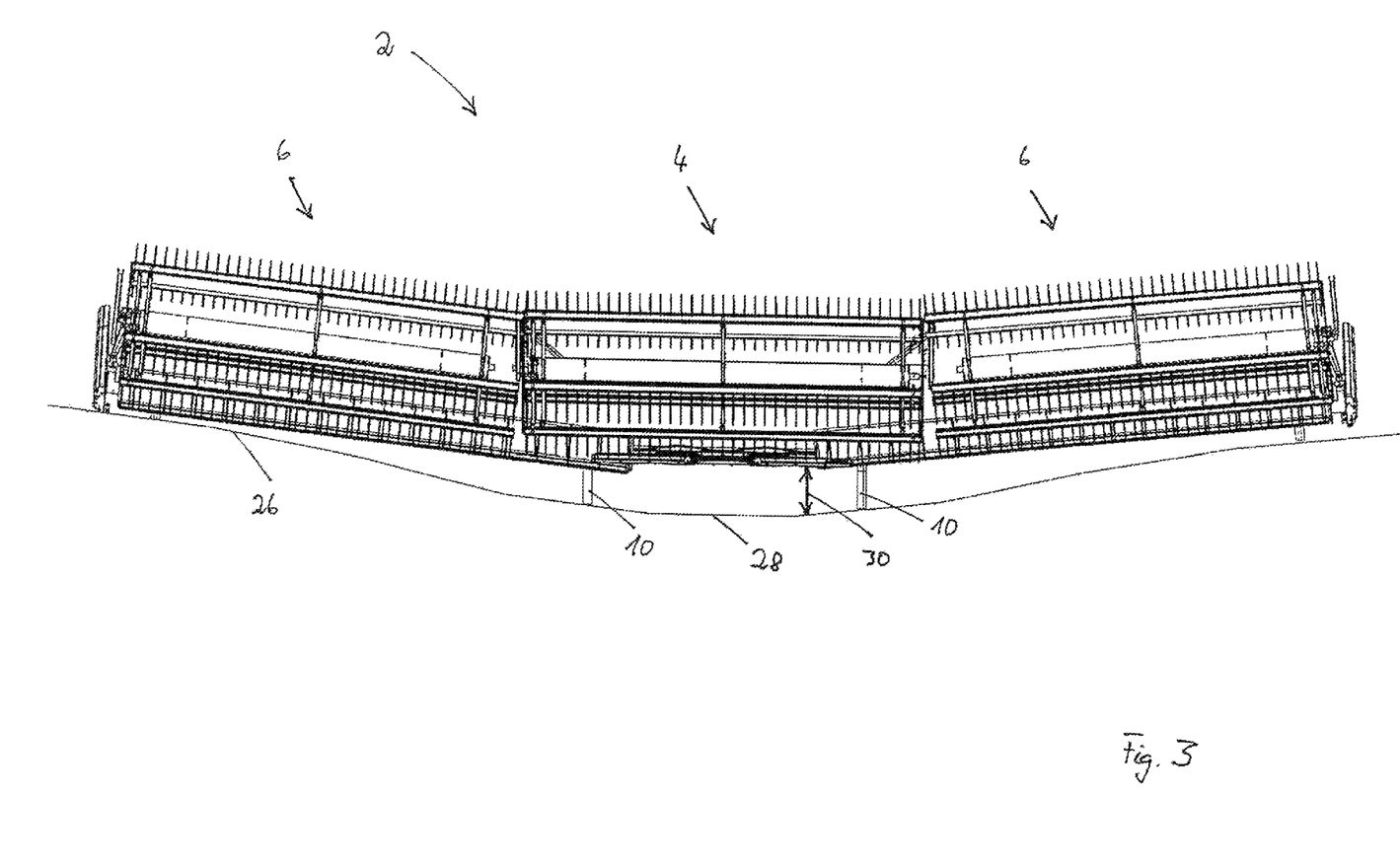
FIG. 3: shows a view onto the harvesting head traveling through a trough.

FIG. 3 shows a possible harvesting situation in which the harvesting head 2 travels through a trough 28. While the middle section 4 is in an almost horizontal position, the two side sections 6 with their free ends are pivoted upward so that a bending angle of circa 10° is adjusted between the middle section 4 and the two side sections 6. While the ground distance 30 in the area of the middle section 4 is so great that the harvesting head 2 could still be lowered at this degree of distance, the ground distance 30 is so slight in the area of the free ends of the side sections 6 that upon a further lowering of the middle section 4 downward, the structural components of the articulated connection 12 would be exposed to a significant stress. Upon a further lowering of the middle section 4 the outer ends of the side sections 6 would violently drag on the ground 26, which could lead to damage to the harvesting head 2 and to the carrier device C, comprising a device H for height adjustment (FIG. 1), on the combine. In this situation the correction mode in the evaluation device 16 should prevent that the middle section 4 is lowered down even more. If the sensors 14 report the reaching of a limit value in this position of use of the harvesting head 2, it is all the more important that the evaluation device 16 switches into the correction mode and outputs an adjusting signal to the carrier device C, comprising the device H for height adjustment, in this correction mode upon which signal the harvesting head 2 is raised upward in a direction to remove the stress from the articulated connections 12 between the side sections 6 and the middle section 4.

Figure 4:
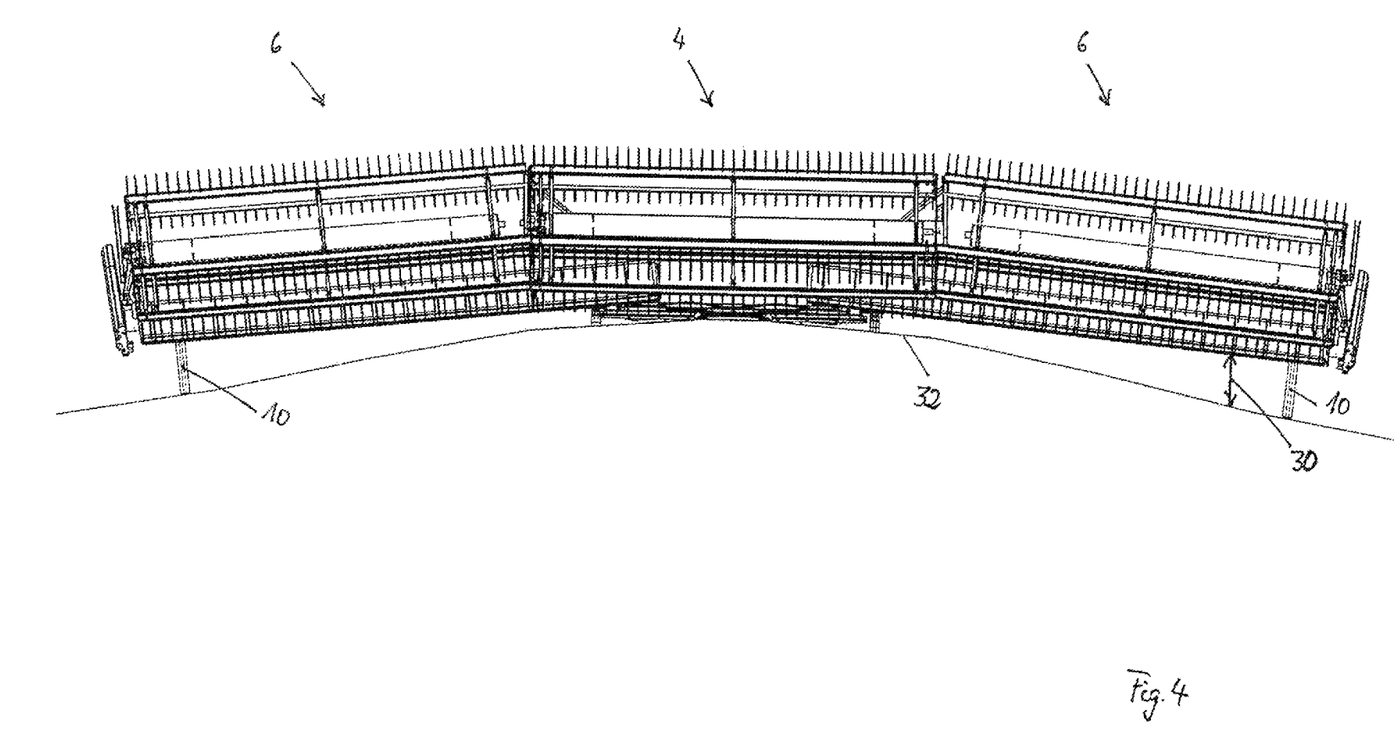
FIG. 4: shows a view onto a harvesting head traveling over a crest.

FIG. 4 shows the harvesting head 2 when traveling over a crest 32. This view does not show the support wheels 34. It can be recognized in this view that the ground distance 30 is very large in the area of the free ends of the side sections 6 whereas it is reduced to a minimum distance in the area of the middle section 4 in the middle area. In this harvesting situation the outer sensors 10 would report to the evaluation device 16 that a further raising of the support wheels 34 of the undercarriage is necessary in order to reestablish a contact with the ground of the particular side section 6 even though the side sections 6 already freely hover over the ground in a mechanically limited manner. However, the evaluation device 16 already has reports from the bending angle sensors 14 in this harvesting situation according to which a limit value has been exceeded in the bending angles of the side sections 6. In this harvesting situation the evaluation device 16 would also tend, on account of the sensor data of the outer sensors 10, to further raise the support wheels 34. However, it can be ensured here by a safety circuit that the side support wheels 34 are not raised further but remain in their position or are even moved downward. As a consequence, they are in a position after the end of this harvesting situation which makes possible the new assuming of the height guidance for the particular side section 6 without a distinct adaptation of the height position of the support wheels 34.

The invention is not limited to the above exemplary embodiment. A person skilled in the art will have no difficulty in modifying the exemplary embodiment in a manner that seems appropriate to him in order to adapt it to a concrete application.

What is claimed is:

1. A harvesting head (2) comprised of several sections (4, 6) and configured to be attached to a harvester, the several sections including a middle section (4) comprising connection elements (8) configured to attach the middle section (4) to a carrier device of the harvester, and the several sections further including at least one side section (6) which is connected by an articulated connection (12) to the middle section (4) and about which the at least one side section (6) is pivotable between a lower limit value and an upper limit value, wherein the carrier device comprises a device for height adjustment, wherein an evaluation device (16) is provided and configured to control adjusting movements of the device for height adjustment, wherein the evaluation device (16) is connected to first sensors (10) which constantly measure a ground distance (30) of the middle section and the at least one side section (4, 6) of the harvesting head (2) during a forward travel of the harvester, wherein the evaluation device (16) converts first sensor signals of the first sensors (10) into adjusting commands for changing a height level of the device for height adjustment and transfers the adjusting commands to an actuator of the device for height adjustment, wherein the harvesting head (2) comprises a second sensor (14) which transmits a second sensor signal via a communication means to the evaluation device (16) upon a pivoting movement of the at least one side section (6) when the upper or lower limit value has been reached during the pivoting movement of the at least one side section (6) relative to the middle section (4), wherein the evaluation device (16) comprises an evaluation circuit configured to switch the evaluation device (16) upon the presence of the second sensor signal into a correction mode for a height adjustment of the carrier device, and the evaluation device (16) outputs a first adjusting signal in the correction mode with which the carrier device is adjusted up or down by the evaluation device (16) depending on the second sensor signal, and wherein the evaluation device (16) emits a second adjusting signal in the correction mode with which the carrier device is adjusted by the evaluation device (16) into a movement which rotates the harvesting head (2) about a longitudinal middle axis (24) of the harvester; wherein the evaluation device (16) queries sensor values of the first sensors (10) continuously, compares a series of the sensor values in regard to a sequence thereof to derive therefrom a first trend prediction of an adjusting direction imminent for the middle section (4), queries sensor values of the second sensor, the second sensor continuously monitoring the pivoting movement of the at least one side section (6), compares a series of the sensor values in regard to a sequence thereof to derive therefrom a second trend prediction of an adjusting direction imminent for the middle section (4), conducts both the first and the second trend predictions to a bandwidth filter for evaluation and emits the first adjusting signal in the case of an absence of a value from the bandwidth filter to move the carrier device up or down by the evaluation device (16) according to results of the evaluation of the bandwidth filter.

2. The harvesting head (2) according to claim 1, wherein the evaluation device (16) queries sensor values of the first sensors continuously in the correction mode, determines based on the sensor values whether a minimum ground distance (26) is being maintained, and blocks a further lowering of the carrier device by a safety circuit when the minimum ground distance is no longer maintained.

3. The harvesting head (2) according to claim 1, wherein a support wheel (34) arranged on the at least one side section (6) is adjusted in height by the evaluation device (16), and the evaluation device (16) holds the support wheel (34) in the correction mode in a current position or moves the support wheel (34) downward when the second sensor (14) for the at least one side section (6) transmits a sensor signal to the evaluation device (16) which indicates that the at least one side section (6) is located in the area of a lower stop and/or of the lower limit value.

4. A method for regulating the height of a harvesting head (2) according to claim 1, the method comprising:
   the evaluation device (16) querying the second sensor (14) with software support,
   the second sensor (14) transmitting upon a pivoting movement of the at least one side section (6) the second sensor signal to the evaluation device (16) when the upper or lower limit value has been reached during the pivoting movement of the at least one side section (6) relative to the middle section (4),
   the evaluation device (16) switching upon the presence of the second sensor signal via the evaluation circuit into the correction mode for the height adjustment of the carrier device,
   the evaluation device (16) outputting the first adjusting signal in the correction mode with which the carrier device is adjusted up or down by the evaluation device (16) depending on the second sensor signal, and
   the evaluation device (16) outputting the second adjusting signal in the correction mode with which the carrier device is adjusted by the evaluation device (16) into the movement which rotates the harvesting head (2) about the longitudinal middle axis (24) of the harvester.

* * * * *